United States Patent [19]

Lawrence

[11] 4,141,102
[45] Feb. 27, 1979

[54] WINDSHIELD WIPER RESTRAINT DEVICE
[75] Inventor: Dean M. Lawrence, Aurora, Ill.
[73] Assignee: Caterpillar Tractor Co., Peoria, Ill.
[21] Appl. No.: 851,244
[22] Filed: Nov. 14, 1977
[51] Int. Cl.² .............................................. B60S 1/04
[52] U.S. Cl. ................................ 15/250.16; 15/250.19
[58] Field of Search ............ 15/250.16, 250.17, 250.18, 15/250.19; 296/28 C

[56] References Cited
U.S. PATENT DOCUMENTS

| | | | |
|---|---|---|---|
| 1,687,412 | 10/1928 | White, Jr. | 15/250.16 |
| 1,826,672 | 10/1931 | Oishei | 15/250.16 |
| 1,973,071 | 9/1934 | Hilton | 15/250.19 |
| 3,019,468 | 2/1962 | Hatch | 15/250.19 |
| 4,009,901 | 3/1977 | Barbee | 15/250.16 |

Primary Examiner—Peter Feldman
Attorney, Agent, or Firm—Frank L. Hart

[57] ABSTRACT

Restraint device for holding a windshield wiper assembly in a stored nonoperating position against inadvertent movement of the windshield wiper assembly and particularly the windshield wiper blade in directions normal to its usual path of wiping movement even in the absence of the windshield from its usual shielding position.

3 Claims, 3 Drawing Figures

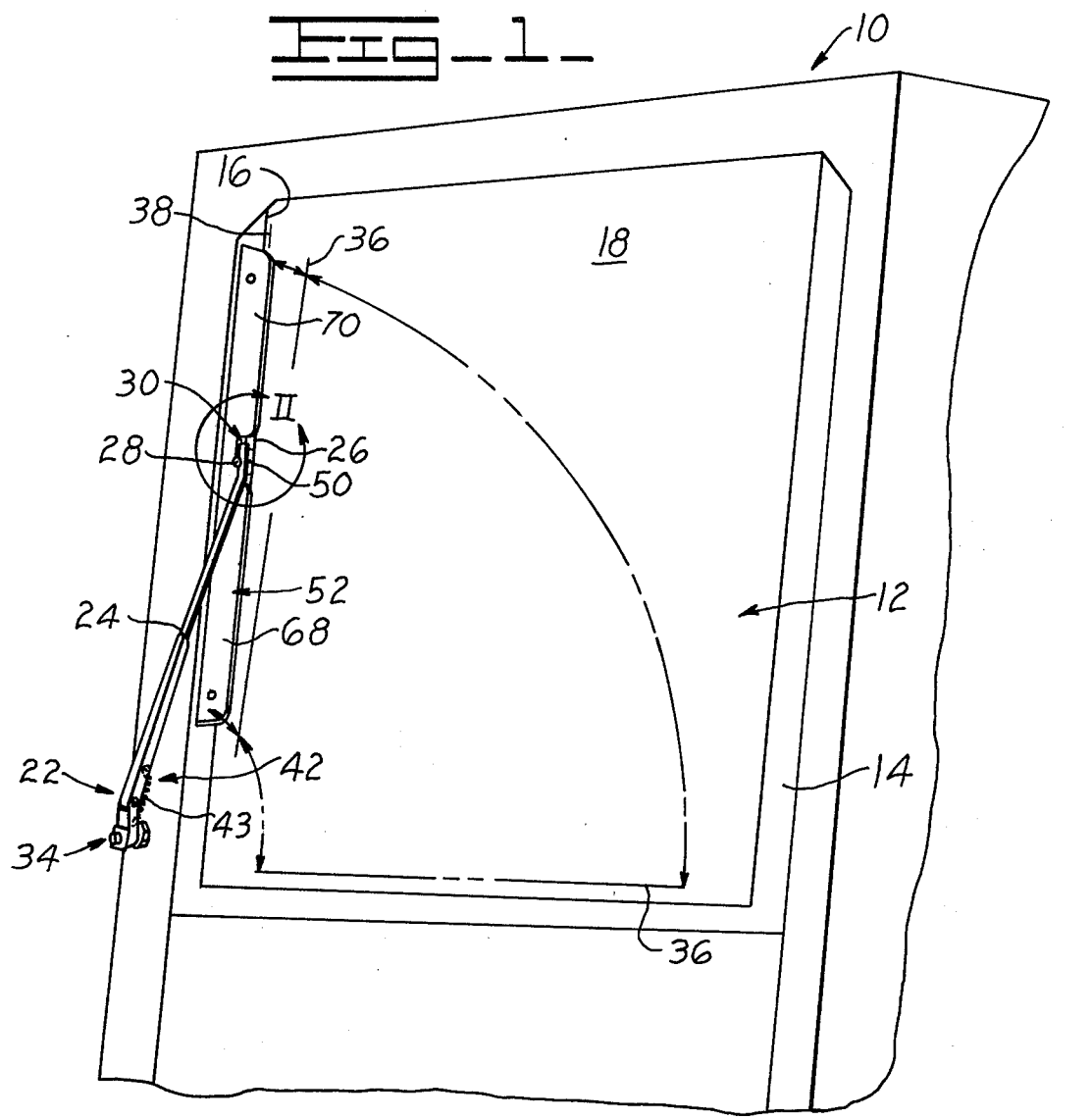
Fig-1-
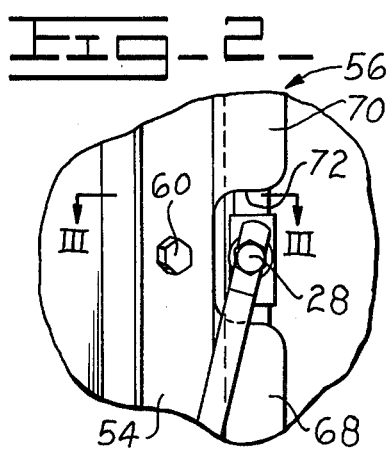
Fig-2-
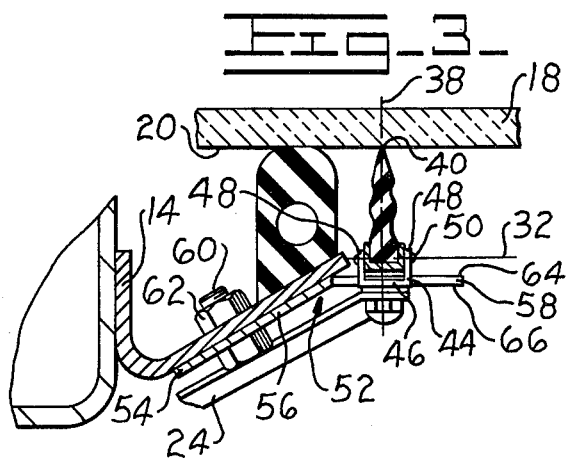
Fig-3-

WINDSHIELD WIPER RESTRAINT DEVICE

BACKGROUND OF THE INVENTION

Windshield assemblies of the type used in applications where they shield the operator from the environment frequently employ a windshield wiper and assemblies operatively associated with the windshield to maintain a clear field of vision for the operator. In many instances, such windshields and windshield wiper assemblies are employed in cab structures of vehicles, such as those in the earthmoving and material handling industries. Vehicles of this type encounter exceptionally rough terrain and frequently speeds adequate to cause erratic flapping of the windshield wiper which is detrimental to the life of the windshield wiper. In addition, such flapping creates a visual and audible annoyance for the operator.

Frequently, earthmoving machines include removable or retractable windshields. Such windshields create a problem when removed or retracted as the windshield wiper assembly is biased towards the windshield and in abutment therewith. With the windshield removed, the windshield wiper extends into the operator's cab area creating an additional problem when trying to return the windshield to the installed position without damaging the windshield wiper assembly. Damage in this instance may be caused to the windshield wiper assembly through overstressing of the wiper assembly by pulling the assembly away from the opening, or catching the windshield wiper assembly between the windshield and frame.

Also, windshield wiper assemblies are frequently subjected to adverse environmental conditions caused by nature and/or vehicle operation. Abrasive materials such as dust, sand and the like bombard the windshield wiper assemblies while the machine is operating, causing rapid wear of the wiper blades and frequent replacement thereof. Ice buildup and snow, along with abrasive material bombardment, continues to reduce the life of the wiper blades even when the machine is not being operated while stored out of doors.

SUMMARY OF THE INVENTION

The present invention is directed to overcoming one or more of the problems as set forth above. According to the present invention, a windshield wiper assembly is provided for a retractable or removable windshield and includes a blade which is normally movable in wiping relation across the windshield between predetermined spaced locations corresponding to the opposite limits of normal operating wiper travel with the assembly providing a blade storage position on the windshield adjacent to one of said limits of wiper travel. A restraint device is operatively associated with the windshield wiper assembly to limit blade movement when in its stored position in directions substantially normal to its usual path of wiping movement even in the absence of the windshield.

BRIEF DESCRIPTION OF THE DRAWINGS

FIG. 1 is an isometric view of a partial cab structure including the apparatus of the invention; and FIG. 2 is a partial enlarged elevational view of the restraint device and wiper assembly of this invention; and FIG. 3 is an enlarged sectional view taken along line III—III of FIG. 2 showing partially the restraint means of a wiper assembly of this invention.

Referring to FIG. 1 of the drawings, a cab for use in earthmoving and material handling vehicles is generally indicated at 10. The cab includes a windshield assembly 12, having a supporting member such as a frame 14, providing an inside edge 16, a transparent windshield 18 having an outer substantially planar surface 20, and a windshield wiper assembly 22. The windshield 18 is removably or retractably secured to the frame 14 in any suitable manner permitting the occupant of the cab 10 to operate the vehicle with or without the windshield 18 in the normal shielding position.

The windshield wiper assembly 22 associated with the windshield 18 is provided to maintain a clear field of view for the occupant. The windshield wiper assembly 22 includes a wiper arm 24 and an elongated wiper blade 26 and a means 28 for connecting the wiper arm 24 to the wiper blade 26. The connecting means 28 connects a first end 30 of the wiper arm 24 to the wiper blade 26 in a manner so as to support the wiper blade 26 for pivotal movement about an axis 32 substantially parallel to the planar surface of the windshield 18. A second end 34 of the wiper arm 24 is connected to a drive mechanism (not shown) which causes the windshield wiper assembly 22 to move across the windshield 18 between predetermined spaced locations 36, corresponding to opposite limits of normal operating wiper travel. A wiper blade storage position 38 on the windshield 18 is provided for the wiper blade 26 between one of the spaced locations 36, and an adjacent inside edge 16. It is to be noted that the leading edge 40 of the wiper blade 26 remains on the surface 20 of the windshield 18 when the wiper blade 26 is in the stored position 38 and the windshield 18 in its normal shielding position.

The contact between the leading edge 40 and the surface 20 of windshield 18 is maintained by a wiper arm biasing means 42. Since wiper arm biasing means are well known in the prior art, it is sufficient to mention that the first end 30 of the wiper arm 24 carrying the wiper blade 26 is urged toward the windshield 18 by a resilient member such as spring 43.

Referring to FIGS. 2 and 3, in order for the leading edge 40 to maintain complete edge contact with the surface 20 of the windshield 18, the connecting means 28 includes a "U" shaped member 44, rigidly secured at its base portion 46 to the first end of the wiper arm 24 in any suitable manner. The extending legs 48 of the "U" shaped member 44 receive between them the wiper blade 26. A pin 50 defining axis 32 secures the wiper blade 26 to the "U" shaped member 44 and allows limited pivotal movement thereabout to permit the wiper blade to follow the surface 20 of the windshield and maintain complete edge contact therewith.

A restraining means 52 is operatively associated with the windshield wiper assembly 22 to restrain the windshield wiper assembly 22 against movement in a direction normal to the usual path of wiping movement as defined by surface 20, with or without the windshield 18 in its normal shielding position. The restraining means includes a member 54 generally rectangular in shape and having a mounting portion 56 and a restraint portion 58. The mounting portion 56 is secured to the vehicle frame 14 by a plurality of fasteners such as bolt 60 and nut 62. The use of removable fasteners such as bolt 60 and nut 62 permits the addition of and the deletion of the restraint means 52 from existing windshield assemblies. The restraint portion 58 extends past the inside edge 16 of the frame 14 a distance sufficient to overlay a portion of the windshield 18.

The restraint portion 58 is preferably shown as a rectangular shaped extension of the mounting portion 56 and overlies a portion of the windshield 18 adjacent the storage position 38 of the wiper assembly 18. A bottom surface 64 of the restraint portion is substantially equally spaced from the surface 20 a distance at least equal to and preferably slightly larger than the height of the wiper blade 26 and a top surface 66 of the restraint portion is spaced from the surface 20 a distance preferably slightly less than the distance between the wiper arm 24 and the surface 20. This permits the wiper blade 26 to lie beneath the restraint portion 58 and the wiper arm 24 above the restraint portion 58 with the windshield in its normal shielding position and limits movement of the windshield wiper assembly in directions normal to the usual path of wiping movement.

The restraint portion 58 includes a first portion 68 located between the wiper arm 24 and wiper blade 26 on one side of the connecting means 28 and overlying said wiper blade 26 and a second portion 70 overlying the wiper blade on the other side of the connecting means 28. The first and second portions 68, 70 may be separate and each include their own mounting portion 56 or preferably, as shown, a complete unitary structure joined by the mounting portion 56. A notch 72 is provided in the restraint portion 58 to separate the first and second portions 68 and 70 of the restraint portion 58 and is in alignment with connecting means 28 to permit the wiper arm 24 to be positioned beneath the restraint portion 58. Preferably the restraint portion 58 is of a length substantially equal to the length of the wiper blade 26 to generally cover and protect the wiper blade 26 at the stored position 38 of the windshield wiper assembly 18.

In the operation of the windshield assembly, the windshield wiper assembly 22 is selectively actuated by the occupant of the cab to effect translation of the windshield wiper assembly 22 across the surface 20 of the windshield 18 from the storage position 38 and cyclically between spaced locations corresponding to opposite limits of normal operating wiper travel. It is to be noted that the wiper blade is in contact with the surface 20 of the windshield 18. Upon completion of the cyclical operation of the windshield wiper assembly 22, as determined by the occupant, the windshield wiper assembly 22 is returned automatically to the storage position 38 wherein the wiper blade 22 lies beneath the restraint portion 58 of the member 54 and the wiper arm 24 lies above the restraint portion 58.

With the windshield installed, the restraint portion 58 limits motion of the windshield wiper assembly 18 away from the windshield 16 and the restraint portion 58 shields the wiper blade 26 from direct contact with abrasive material bombarding the windshield 18.

With the windshield 16 removed or retracted from the frame 14 of the vehicle, as frequently desired by the operator, the biasing means 42 urges the wiper assembly toward the surface 20 of the windshield 18. With the windshield wiper assembly 22 in the stored position 38, and the windshield 18 removed from its normal shielding position, the windshield wiper arm 24 contacts the top surface 66 of the first portion 68 and limits movement of the windshield wiper assembly 22 toward the planar surface 20 defined by the windshield 18 when in the installed position. It will be appreciated that the combination of the first and second portions 68, 70 of the restraint portion 58 of the member 54 also limits pivotal movement of the wiper blade 26 about the pin 50.

The restraint means 52 of this invention is best suited for windshield wiper assemblies 22 where the wiper blades leading edge 40 is continuously in contact with the windshield in the normal shielding position and biased toward the occupant's cab area when the windshield is removed. Further, the restraint means 52 also prevents movement of the windshield wiper assembly in a direction outwardly from the cab area in response to wind or other forces overcoming the biasing force of the spring and also protects the wiper blade from excessive wear due to environmental conditions.

It will be appreciated that this invention alleviates all problems of operator annoyance and damage caused to the windshield wiper assembly 22 by totally restricting all motion of the windshield wiper assembly in directions normal to the plane 20 defined by the surface of the windshield 16 when the wiper assembly is in the stored position.

THE EMBODIMENTS OF THE INVENTION IN WHICH AN EXCLUSIVE PROPERTY OR PRIVILEGE IS CLAIMED ARE DEFINED AS FOLLOWS:

1. In a windshield assembly having a frame, a windshield movably supported on the frame, a windshield wiper assembly having a wiper blade, said blade being movable across the windshield between predetermined spaced locations and to a blade storage position adjacent one of the spaced apart locations, the improvement comprising:
   blade restraining means for automatically maintaining the blade at the stored position in contact with the windshield in the presence of said windshield and against movement in directions substantially normal to the windshield.

2. The windshield assembly as set forth in claim 1, including;
   an arm;
   means for connecting the blade to the arm; and
   first and second blade portions each positioned on an opposed side of said connecting means, said first portion being positioned between said arm and said blade at the stored position and said first and second portions being spaced from the windshield a preselected distance sufficient for limiting pivotal movement of the blade and movement of the blade in directions normal to the windshield, said movements being limited to preselected values.

3. A windshield assembly, as set forth in claim 2, wherein the restraining means is unitary and the first and second portions are defined by a notch.

* * * * *